Figure 1:
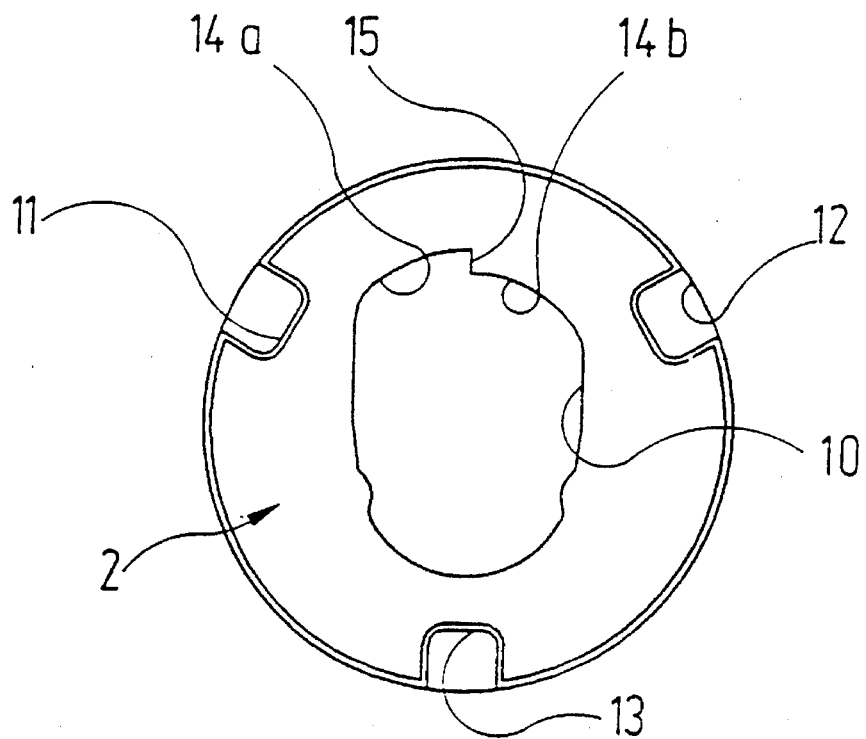

United States Patent [19]
Oberdörfer

[11] Patent Number: 5,609,188
[45] Date of Patent: Mar. 11, 1997

[54] SANITARY MIXER TAP

[75] Inventor: Hans Oberdörfer, Stuttgart, Germany

[73] Assignee: Hansa Metallwerke AG, Stuttgart, Germany

[21] Appl. No.: 525,768
[22] PCT Filed: Mar. 1, 1994
[86] PCT No.: PCT/EP94/00588
  § 371 Date: Dec. 6, 1995
  § 102(e) Date: Dec. 6, 1995
[87] PCT Pub. No.: WO94/21948
  PCT Pub. Date: Sep. 29, 1994

[30] Foreign Application Priority Data

Mar. 20, 1993 [DE] Germany ............ 43 08 994.1

[51] Int. Cl.[6] ............................................ F16K 11/06
[52] U.S. Cl. ..................... 137/625.4; 137/625.17
[58] Field of Search ............. 137/625.17, 625.4

[56] References Cited

U.S. PATENT DOCUMENTS 4,623,000 11/1986 Kropp ................. 137/625.17

*Primary Examiner*—John C. Fox
*Attorney, Agent, or Firm*—Lowe, Price, LeBlanc & Becker

[57] ABSTRACT

A sanitary mixer tap contains a first fixed control disc (1) having a first through aperture (4) communicating with a cold water supply and a second through aperture (5) communicating with a hot water supply and laterally inverted in relation to a central plane M—M. Above the first control disc (1) there is a second control disc (2) which can be moved linearly and rotated in relation to the fixed control disc (1) in the prior art manner to alter the quantity and temperature of the mixed water flowing from the mixer tap. The recess (10) in the movable control disc (2), which can be caused to overlap variably with the through apertures (4, 5) in the fixed control disc (1), has a specially shaped control edge (14). This is so designed that, when the sanitary mixer tap is opened, in the centrally rotated position of the movable control disc (2), it first solely brings about an overlap with the through aperture (4) in the fixed control disc (1) connected to the cold water supply. It is not until later during the opening movement that hot water can also reach the outlet of the sanitary mixer tap.

5 Claims, 3 Drawing Sheets

SANITARY MIXER TAP

The invention concerns a sanitary mixer tap with a) a fixed control disc which has a first through aperture communicating with a cold water supply and, symmetrically to a central plane, a second through aperture communicating with a hot water supply;

b) a second movable control disc lying on the fixed control disc which may be moved linearly with respect to the fixed control disc for alteration of the amount of water flowing out and twisted for alteration of the temperature and has for this a recess connected to an outlet which may be caused to overlap variably with the two through apertures of the fixed control disc, whereby c) On the limiting line of the recess in the movable control disc which is the leading limiting line in the direction of opening a control edge is formed shaped such that the movable control disc in its central rotated position when opening unblocks both through apertures of the fixed control disc in different ways.

Amongst the most widespread of sanitary mixer taps may be counted so-called single lever taps such as are also used in particular in wash-stands. In them, the cold water and hot water paths are generally treated symmetrically. This means in particular that when opening the mixer in the central rotated position of the movable control disc cold and hot water are released in the same manner into the flow. The central rotated position of the movable control disc is that which is generally adopted in the closed position. This is often done unconsciously with single lever mixers by the user since out of a sense of tidiness he seeks to have the control lever aligned with the outlet of the appliance. Many constructions furthermore provide that the sanitary mixer tap can only be turned off in this central rotated position so that the movable control disc thus automatically returns to the central rotated position on turning off the appliance. If a sanitary tap of this type which has been closed in the central rotated position of the movable control disc is now opened, then in principle both cold and hot water flow at first even when the user does not actually either need or desire this for the purpose he has in mind e.g. for washing his hands. In general the temperature of the water flowing out is not corrected towards cold on the grounds of idleness. In this manner much energy is wasted.

A sanitary mixer tap of the type specified at the outset is described in DE-PS 33 10 080. In this the symmetrical treatment of cold and hot water flows is sacrificed for a quite specific purpose. This known appliance is intended for use with continuous-flow water heaters in which provision must be made for a minimum throughput of hot water for avoidance of frequent switching on and off. For this reason, the control edge on the recess of the movable control disc of this tap has an outline by which the hot water area is preferably opened wide, that is to say that mainly hot water flows and colder water is then produced by mixing in cold water. The only reason for this outline of the control edge of the known tap is thus the special application in a continuous-flow water heater and basically leads to undesirable conditions from an energy point of view.

It is the task of the present invention to arrange a sanitary mixer tap of the type specified at the outset such that any unwanted hot water flow and thereby unwanted energy losses are avoided.

This task is solved according to the invention in that d) the control edge on the recess of the movable control disc is shaped such that when opening the tap in the central rotated position of the movable control disc first of all only the through aperture of the fixed control disc connected to the cold water supply is opened and only after continued linear motion of the movable control disc is the through aperture of the fixed control disc connected to the hot water supply also unblocked.

The invention thus makes use for its purposes of the knowledge already indicated above that when turning off the mixer tap the movable control disc is generally brought back into its central rotated position. Through the special outline of the control edge on the movable control disc, a situation is arrived at that when turning on the tap at first only cold water is offered to the user. In many cases the user is satisfied with this without being especially aware of it. Only in those cases in which the user finds the cold water to be inadequate or unpleasant will he specially turn the movable control disc in that direction which corresponds to an increase in the temperature of the mixed water flowing out. The appliance according to the invention responds to this rotational movement with the desired increase in the temperature of the mixed water. The invention thus takes advantage in a certain sense of the "idleness" of the person operating it: whereas with known sanitary appliances this idleness gives rise to unnecessary hot water flows, with the present invention hot water only flows when this is actively desired. By this means, significant energy savings can be attained particularly where the sanitary mixer tap is fitted in a public area.

A particularly suitable arrangement is that in which the control edge is subdivided into two areas which are joined to one another via a step. In this the step runs parallel to that direction in which the movable control disc is displaced when opening the tap in its central rotated position. Thus a leading zone of the control edge and a trailing zone result whereby the leading zone is associated with the cold water through aperture and the trailing zone with the hot water through aperture of the fixed control disc.

In very many cases, sanitary mixer taps of the type mentioned at the outset are formed such that the through apertures of the fixed control disc are ring segments. In these cases provision is made with a particular embodiment of the invention that both zones of the control edge are shaped as arcs of a circle whose radius corresponds to the radius of the radially inner limiting line of the through aperture of the fixed control disc. This measure ensures that at least in the central rotated position of the movable control disc the quantity of water flowing out is proportional to the linear displacement of the movable control disc.

Preferably, in the central rotated position of the movable control disc, the step aligns with the central plane of the fixed control disc. The movable control disc of the tap according to the invention then behaves as if it were rather more widely open in that half which is associated with the cold water through aperture than in that half which corresponds to the hot water through aperture of the fixed control disc.

If the height of the step is identical to the width of the through apertures of the movable control disc, then when opening the sanitary tap in the central rotated position of the movable control disc first of all the cold water flow is opened to its maximum strength before any hot water flow is then also unblocked on further opening.

Figure 2:
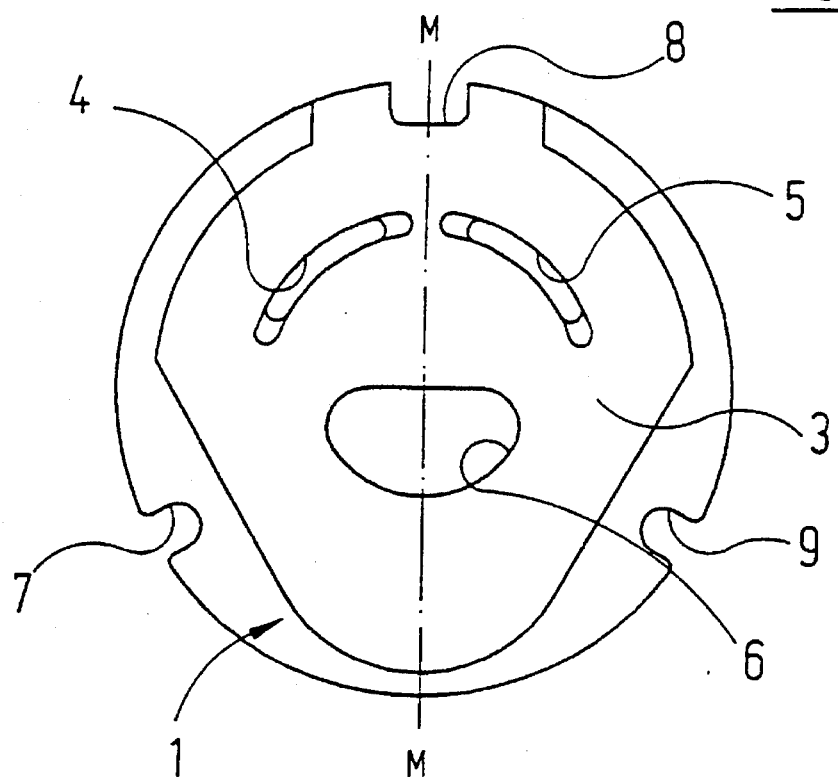
Figure 3:
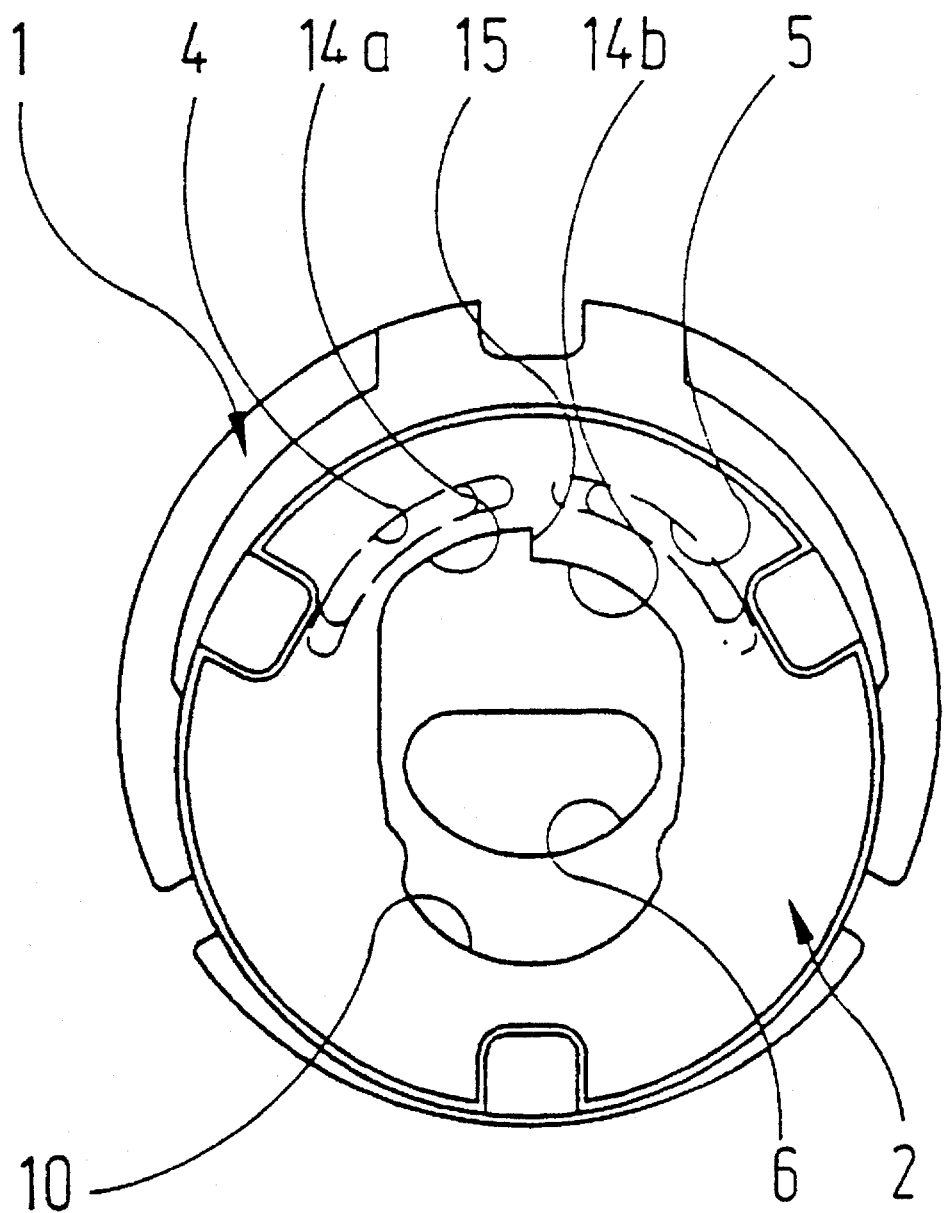
Figure 4:
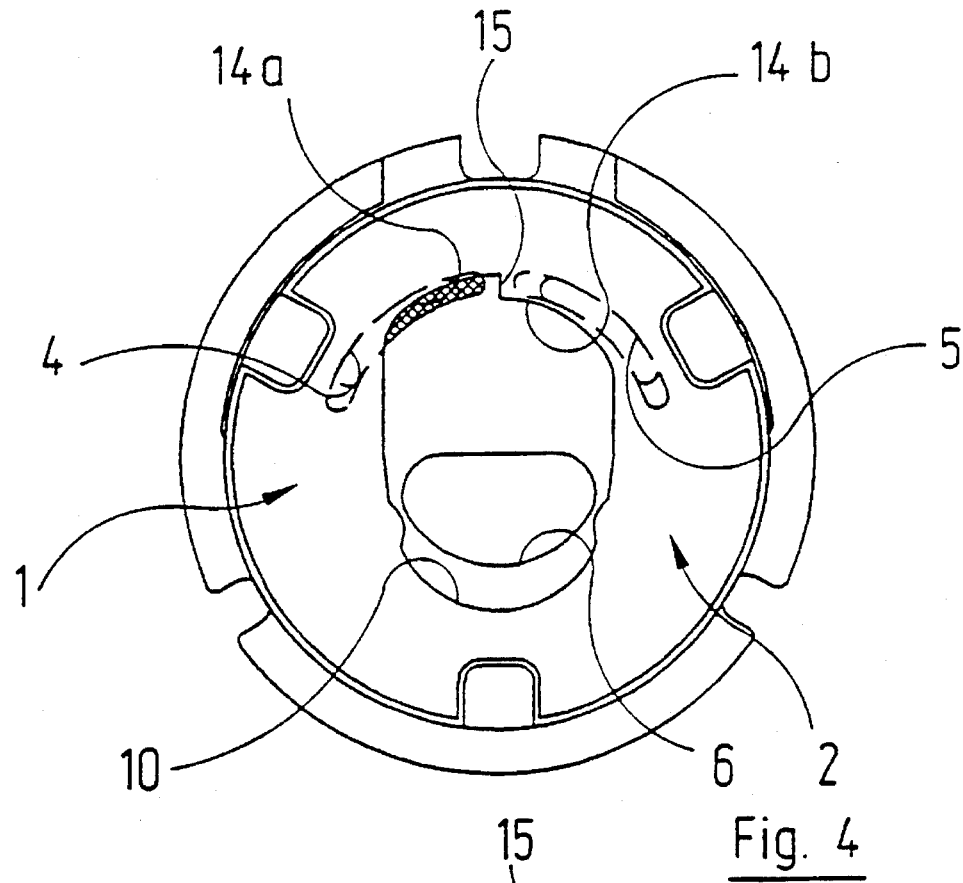
Figure 5:
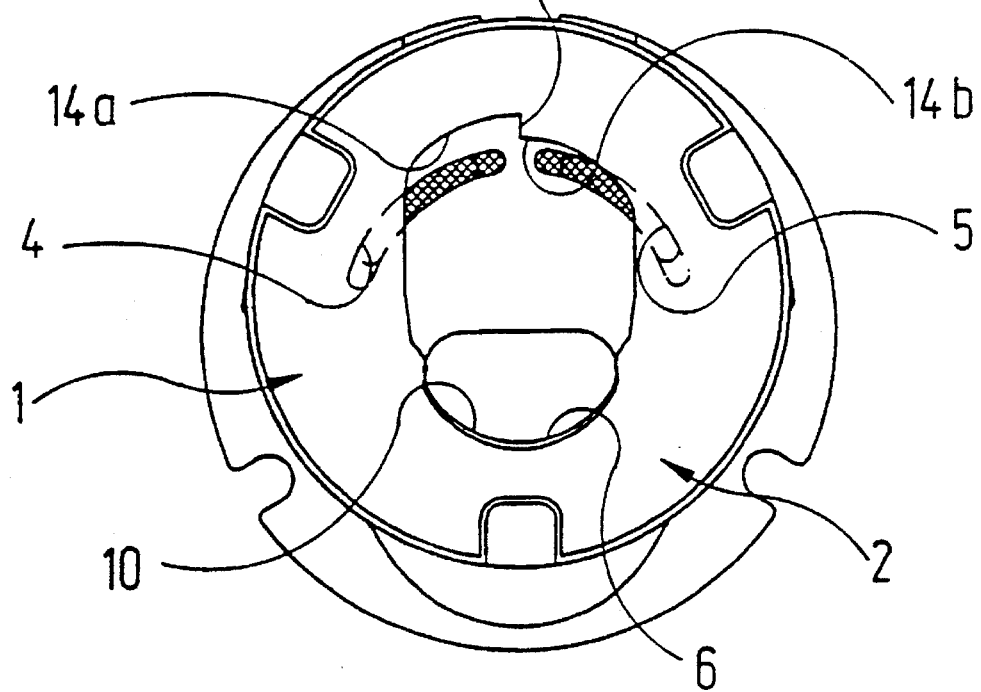

One embodiment of the invention is further elucidated below by means of the drawings which show the following:

FIG. 1 the top view of the movable control disc of a sanitary mixer tap;

FIG. 2 the top view of the fixed control disc of the sanitary mixer tap belonging to the movable control disc of FIG. 1;

FIG. 3 the control discs of FIGS. 1 and 2 superimposed on each other in the closed position of the sanitary mixer tap;

FIG. 4 a view, similar to that of FIG. 3, but at the beginning of the opening of the sanitary mixer tap in a central rotated position of the movable control disc;

FIG. 5 a view, similar to that of FIG. 4, but with complete opening of the sanitary mixer tap and in a central rotated position of the movable control disc;

In the drawing, only the principal components of the sanitary mixer tap are depicted, namely a fixed control disc 1 (FIG. 2) and a movable control disc 2 (FIG. 1). In general these principal components are combined in a cartridge casing which contains those construction elements which render the fixed control disc 1 immobile, that is to say neither rotatable nor movable, and which hold the movable control disc 2 in a manner such that it may be both linearly displaced and also twisted on the fixed control disc 1. The forms of construction of cartridges of this type are in themselves known so that they need not be further elucidated here.

The fixed control disc shown in FIG. 2 is basically known in the manner shown. It generally consists of a ceramic or similar, very hard material and is polished to a very high quality on the upwards facing area 3. Area 3 fulfils the function of a valve seat in the mixer tap.

Fixed control disc 1 has two through apertures 4, 5 symmetrical about a central plane M—M which both have the shape of a ring segment. The common central point of the ring segments lies on the axis of rotation about which the movable control disc 2 of FIG. 2 may be twisted. In the embodiment depicted, this axis of rotation is identical with the central point of the fixed control disc 1. Both through apertures 4, 5 are funnel shaped, that is to say that they widen conically from the face of the fixed control disc lying behind the drawing plane of FIG. 2 to the polished area 3 lying in the drawing plane.

The through aperture 4 of fixed control disc 1 lying on the left in FIG. 2 is connected to the cold water supply of the sanitary mixer tap; the through aperture 5 lying on the right is connected in a corresponding manner to the hot water supply.

The fixed control disc 1 furthermore contains a third through aperture 6 formed symmetrically about the central plane M—M which is joined to the outlet of the sanitary mixer tap.

The fixed control disc 1, as shown in FIG. 2, furthermore displays three recesses 7, 8, 9 on its periphery which are responsible for the rotationally immobile fixing in the cartridge casing which is not shown.

FIG. 1 shows the top view of the movable control disc 2 which cooperates with the fixed control disc 1 of FIG. 2. In it a single through aperture 10 with a relatively large area is formed about which the details are gone into below.

The movable control disc 2 is also manufactured from a ceramic or similarly hard material. On the face lying behind the drawing plane of FIG. 1 it has at least one polished area which, when control discs 1 and 2 are assembled as shown in FIGS. 3 to 5, lies on the polished area 3 of the fixed control disc 1.

In the ready assembled sanitary mixer tap a plastic part which may be moved jointly with it is placed tightly on the face of the movable control disc 2 lying in the drawing plane of FIG. 1. This covers the through aperture 10 and thus turns it into a diversion channel which steers the water flows between the through apertures 4, 5 and 6 of the fixed control disc 1 in a known manner according to the positioning in each case of the movable control disc 2 relative to the fixed control disc 1.

Three recesses 11, 12 and 13 on the periphery of the movable control disc 2 serve for the connection to the plastic part mentioned that for its part is joined to the operating lever of the sanitary mixer tap via an adjustment shaft provided with the requisite degrees of freedom.

With known mixer taps, which do not fulfil any special function (such as for example the one which is described in the DE-O-33 10 080 mentioned at the beginning), the through aperture 10 of the movable control disc 2 is shaped symmetrically about a central plane of this control disc. This is particularly true for the leading control edge of the known diversion channels in the direction of opening. By this means, a situation should be arrived at such that the control of cold and hot water is symmetrical and that, in the central rotated position of the movable control disc in particular, when opening the tap cold and hot water are thus released in equal measures.

It is on this point that the sanitary mixer tap described here, and in particular the control edge of the through aperture 10 of the movable control disc 2 provided with the reference number 14 in the drawing, differ. As may be inferred in particular from FIG. 1, this control edge is subdivided into two regions 14a and 14b which are separated from one another by a step 15. In this the step 15 lies in that same central plane of the movable control disc 2 which in conventional arrangements would be its plane of symmetry.

Both regions 14a and 14b are formed as arcs of a circle whose radius corresponds to the radius of the inner azimuthal boundary line of through openings 4 and 5 of the movable control disc 1 of FIG. 2. The height of the step 15, which lies between regions 14a and 14b of control edge 14 of the movable control disc 2 is the same as the width of the through apertures 4 and 5 of the fixed control disc 1 of FIG. 2.

The influence that the described arrangement of the control edge 14 of the movable control disc 2 has on the water flows will be elucidated below by means of FIGS. 3 to 5.

In FIG. 3, the closed position of the sanitary mixer tap is depicted as is normally adopted either intentionally or by design. In this position, the movable control disc 2 is located in the central rotated position in which step 15 in the through aperture 10 of the movable control disc 2 aligns with the central plane M—M of the fixed control disc. The areas 14a and 14b of control edge 14 of the movable control disc 2 are located radially inwards from the through apertures 4 and 5 of the fixed control disc 1 so that through aperture 10 of the movable control disc 2 thus does not overlap with any of the through apertures 4 and 5 of the fixed control disc 1. The through aperture 6 of the fixed control disc 1, connected to the outlet of the sanitary mixer tap, is completely within the through aperture 10 of the movable control disc 2.

The sanitary mixer tap—again either unintentionally or directed by its construction—is usually opened starting from the closed alignment shown in FIG. 3 through the movable control disc 2 being driven linearly in a direction which is parallel to the central plane M—M of the fixed control disc 1 of FIG. 2. If this happens, then firstly a relative positioning of the two control discs 1 and 2 occurs as is shown in FIG. 4: area 14A of the control edge on the through aperture 10 of the movable control disc 2, which is on the left in the drawing and which goes on ahead of area 14b of the control edge in the direction of opening, migrates over the through aperture 4 of the fixed control disc 1. By this means an overlap zone - cross-hatched in FIG. 4—is produced between through aperture 4 of the fixed control disc 1 and the through aperture 10 of the movable control disc 2. Due to the step 15 between areas 14a and 14b of the control edge 14 the through aperture 5 of the fixed control disc 1 however still remains completely closed. The consequence of this is that, in the open state of the mixer tap shown in FIG. 4, firstly cold water alone flows from the through aperture 4 of the fixed control disc 1 via the through aperture 10 of the movable control disc 2 to through aperture 6 of the fixed control disc 1 and from there to the outlet. Only on further displacement of the movable control disc 2 parallel to the central plane M—M of the fixed control disc 1 does the area 14b of control edge 14, which lies on the right in the drawing, also migrate over through aperture 5 in the fixed control disc 1. By this means an overlap zone, cross-hatched in the right half of FIG. 5, is now also created between this through aperture 5 and through aperture 10 of the movable control disc. Hot water now accordingly also starts to flow from through aperture 5 of the fixed control disc 1 via the through aperture 10 of the movable control disc 2 to through aperture 6 of the fixed control disc 1 and from there to the outlet of the sanitary mixture tap. In FIG. 5 that position of the movable control disc 2 is shown in which both through apertures 4 and 5 are essentially fully unblocked and in which a situation is thus arrived at which is no longer influenced by step 15 in control edge 14 and thus likewise becomes like that with known taps.

The conditions arising during twisting of the movable control disc 2 from the central rotated position shown in FIG. 5 are obvious: as also happens with known sanitary mixer taps, on clockwise twisting of the movable control disc 2 through aperture 5 of the fixed control disc 1 connected to the hot water supply is further unblocked at the expense of through aperture 4 connected to the cold water supply so that a higher proportion of hot water is present in the mixed water flowing out via through aperture 6. Twisting the movable control disc 2 anti-clockwise brings about the opposite effect.

Even in the initial opening position of the sanitary mixer tap, as shown in FIG. 4, the temperature of the water flowing out may of course be altered. If the movable control disc 2 is actually again twisted in a clockwise direction then step 15, which lies between areas 14a and 14b of the control edge, now begins to migrate over through aperture 5 of the fixed control disc 1 so that an overlap is now produced "from the flank" between through aperture 10 of the movable control disc 2 and through aperture 5 of the fixed control disc 1 which brings in the hot water.

The user is not aware of the special features which the sanitary mixer tap and in particular its movable control disc 2 exhibit. He can alter the temperature of the water flowing out at every stage of the opening according to his wishes. In many cases, though, the cold water which first of all flows out when opening normally from the closed position into the position shown in FIG. 4 is quite for his purposes, e.g. for hand washing, so that he forgoes twisting the movable control disc and thereby an outflow of hot water. With known taps, mixed water would have flowed out here without this being necessary for the user's comfort. The control edge 14 of the movable control disc which is subdivided into two offset areas 14a and 14b thus always firstly offers the user plain cold water and thus gives him the possibility of being satisfied with this. In all cases where this happens, energy is saved.

I claim:

1. Sanitary mixer tap with
   a) a fixed control disc (1) which has a first through aperture (4) communicating with a cold water supply and, symmetrically to a central plane, a second through aperture (5) communicating with a hot water supply;
   b) a second movable control disc (2) lying on the fixed control disc (1) which, with respect to the fixed control disc (1), may be moved linearly for alteration of the amount of water flowing out and twisted for alteration of the temperature and has for this a recess (10) connected to an outlet which may be caused to overlap variably with the two through apertures (4, 5) of fixed control disc (1), whereby
   c) a control edge (14) is formed on the leading limiting line of the recess (10) in the movable control disc (2) in the direction of opening which is shaped such that the movable control disc (2) in its central rotated position when opening unblocks both through apertures (4, 5) of the fixed control disc (1) in different ways, characterised in that
   d) the control edge (14) on the recess (10) of the movable control disc (2) is shaped such that when opening the tap in the central rotated position of the movable control disc (2) first of all only the through aperture (4) of the fixed control disc (1) connected to the cold water supply is opened and only after continued linear motion of movable control disc (2) is the through aperture (5) of fixed control disc (1) connected to the hot water supply also unblocked.

2. Sanitary mixer tap according to claim 1, characterised in that the control edge (14) is subdivided into two areas (14a, 14b) which are joined to one another via a step (15).

3. Sanitary mixer tap according to claim 2 in which the through apertures of the fixed control disc are ring segments, characterised in that both areas (14a, 14b) of the control edge (14) are shaped as arcs of a circle whose radius corresponds to the radius of the radially inner limiting line of the through apertures (4, 5) of the fixed control disc (1).

4. Sanitary mixer tap according to claim 2, characterised in that the step (15) in the central rotated position of the movable control disc (2) aligns with the central plane (M—M) of the fixed control disc (1).

5. Sanitary mixer tap according claims 2 characterised in that the height of the step (15) is identical to the width of the through apertures (4, 5) of the movable control disc (1).

* * * * *